(12) United States Patent
Mercer

(10) Patent No.: US 7,363,502 B1
(45) Date of Patent: Apr. 22, 2008

(54) SYSTEMS AND METHODS FOR POWERING UP CONTROLLERS

(75) Inventor: Gary L. Mercer, Eaton, OH (US)

(73) Assignee: Henny Penny Corporation, Eaton, OH (US)

( * ) Notice: Subject to any disclaimer, the term of this patent is extended or adjusted under 35 U.S.C. 154(b) by 819 days.

(21) Appl. No.: 10/119,195

(22) Filed: Apr. 10, 2002

Related U.S. Application Data

(60) Provisional application No. 60/283,167, filed on Apr. 12, 2001.

(51) Int. Cl.
*H05B 1/02* (2006.01)

(52) U.S. Cl. .................................................. 713/184
(58) Field of Classification Search ............... 99/486; 219/506; 713/184
See application file for complete search history.

(56) References Cited

U.S. PATENT DOCUMENTS

| | | | |
|---|---|---|---|
| 4,210,177 A | | 7/1980 | Moore et al. |
| 4,636,949 A | * | 1/1987 | Longabaugh ............... 700/90 |
| 4,977,537 A | * | 12/1990 | Dias et al. .................. 711/106 |
| 5,331,575 A | * | 7/1994 | Koether et al. ............. 700/300 |
| 5,398,597 A | | 3/1995 | Jones et al. |
| 6,132,782 A | | 10/2000 | Burkett et al. |
| 6,930,290 B2 | * | 8/2005 | Kijimoto et al. ............ 219/506 |

* cited by examiner

*Primary Examiner*—Emmanuel L. Moise
*Assistant Examiner*—Jeffrey D. Popham
(74) *Attorney, Agent, or Firm*—Baker Botts, L.L.P.

(57) ABSTRACT

In one embodiment of the present invention, a system for powering up a controller is described. The system includes a power source, a heat generator adapted to receive power from the power source, and a controller adapted to receive power from the power source and adapted to detect a power interruption from the power source and the controller. The controller includes a clock for continuously monitoring a current time and a current date, software for copying the current time and current date, and a memory for storing the current time and the current date. The controller also includes software for calculating a length of time between the detected power interruption and a power restoration from the power source to the controller, and a password system for preventing unauthorized power restoration from the power source to the heat generator when the length of time is greater than a predetermined length of time.

80 Claims, 15 Drawing Sheets

SYSTEMS AND METHODS FOR POWERING UP CONTROLLERS

The present application claims priority from U.S. Provisional Patent Application No. 60/283,167, entitled "Systems and Methods for Powering up Controllers," the disclosure of which is incorporated herein by reference in its entirety.

BACKGROUND OF THE INVENTION

1. Field of the Invention

The invention relates generally to the field of controllers. Specifically, the invention is directed to a system and method for preventing operation of an apparatus when a controller is removed from a one apparatus and, without authorization, is installed in another apparatus.

2. Description of Related Art

Computer-operated fryers may include a controller, in which the controller may control a cooking of a food product placed within the fryer. Such controllers are described in U.S. Pat. No. 6,132,782 and U.S. Pat. No. 5,398,597, the disclosures of which are hereby incorporated by reference. In addition, known controllers may be removable, such that the controller may be removed from one fryer and reinstalled in another fryer. In addition, the controller may be powered by an external power source. Removing the controller from the fryer results in a power interruption from the power source to the controller. However, events other than the removal of the controller from the fryer also may result in power interruption from the power source to the controller. For example, controller software error, which may be induced by static shock when a person touches the fryer or a faulty connection from the power source to the controller, may result in a power interruption.

SUMMARY OF THE INVENTION

A technical advantage of the present invention is that an owner of a computer-operated fryer including a controller may prevent unauthorized operation of the fryer when the controller is removed from the fryer and reinstalled in another fryer. Another technical advantage of the present invention is that the controller may distinguish between a power interruption from a power source to the controller caused by the removal of the controller and a power interruption due to another cause, such as control software error, based a length of the power interruption. Moreover, if the controller is unable to determine the cause of the power interruption, the controller may prevent operation of the fryer until a user provides verification that they are an authorized user of the fryer. Yet another technical advantage of the present invention is that the controller may be powered by a continuous power source, such that operation of the controller may continue when power provided by a utility service becomes temporarily inoperable. Therefore, a need has arisen for a system and method that overcomes these and other shortcomings of the related art.

In an embodiment of the present invention, a system for powering up a controller is described. The system comprises a power source, a heat generator adapted to receive power from the power source, and a controller adapted to receive power from the power source and also adapted to detect a power interruption from the power source and the controller. The controller comprises a clock for continuously monitoring a current time and a current date, software for copying the current time and current date, and a memory for storing the current time and the current date. The controller further comprises software for calculating a length of time between the detected power interruption and a power restoration from the power source to the controller, and a password system for preventing unauthorized power restoration from the power source to the heat generator when the length of time is greater than a predetermined length of time.

In another embodiment of the present invention, a method for powering up a controller is described. The method comprises the steps of providing a power source, providing a heat generator, and providing a controller, in which the heat generator and the controller receive power from the power source. The method further comprises the steps of detecting a power interruption from the power source to the controller, continuously monitoring a current time and a current date, and copying and storing the current time and the current date. The method further comprises the steps of calculating a length of time between the detected power interruption and a power restoration from the power source to the controller, and preventing unauthorized power restoration from the power source to the heat generator when the length of time is greater than a predetermined length of time.

Other objects, features, and advantages will be apparent to persons of ordinary skill in the art in view of the following detailed description of the invention and the accompanying drawings.

BRIEF DESCRIPTION OF THE DRAWINGS

For a more complete understanding of the present invention, the needs satisfied thereby, and the features and advantages thereof, reference now is made to the following descriptions taken in connection with accompanying drawings.

DETAILED DESCRIPTION OF PREFERRED EMBODIMENTS

Preferred embodiments of the present invention and their advantages may be understood by referring to FIGS. 1-14, like numerals being used for like corresponding parts in the various drawings.

Figure 1:
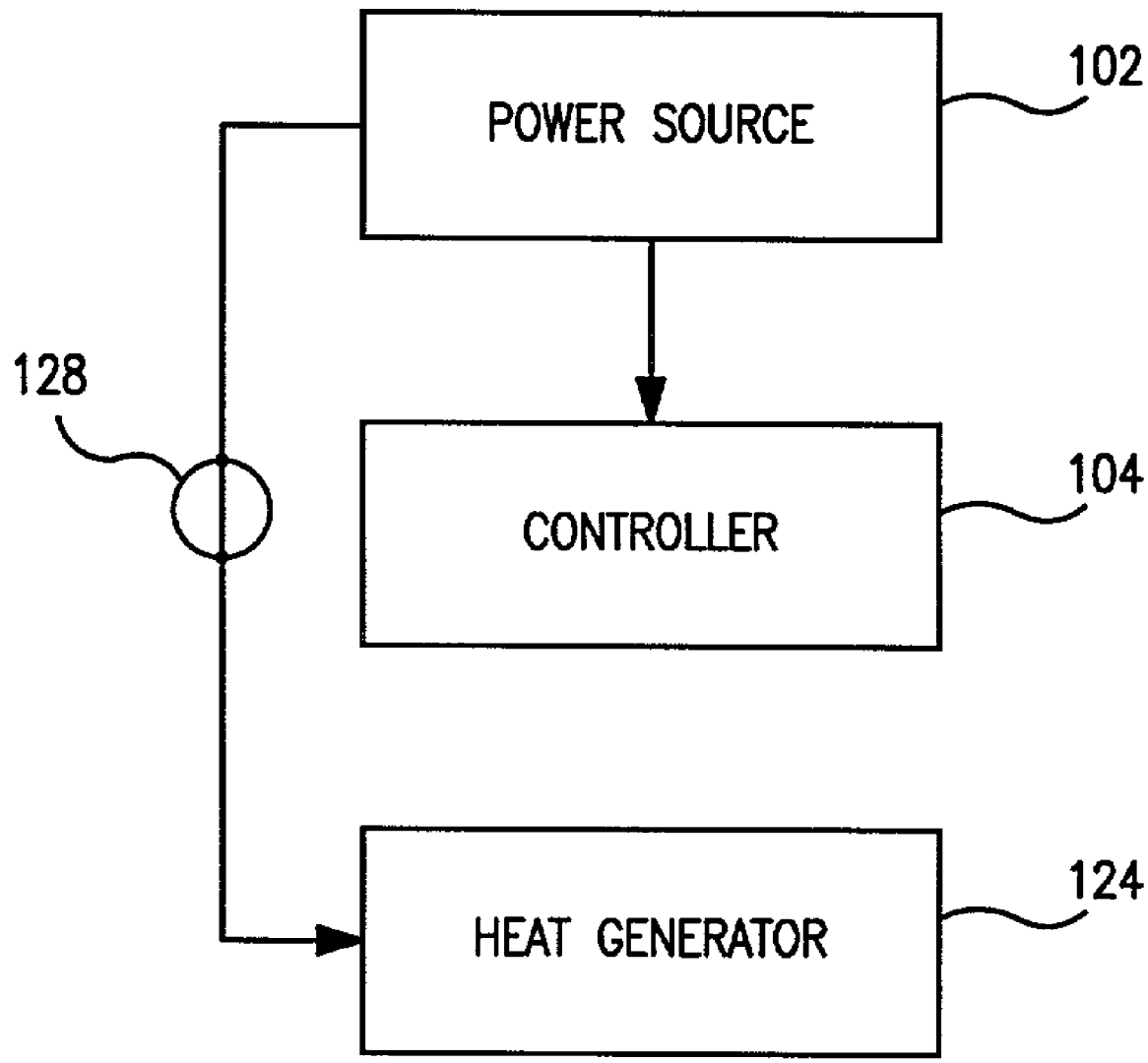
FIG. 1 is a schematic of a system for powering up a controller according to an embodiment of the present invention.
Figure 1A:
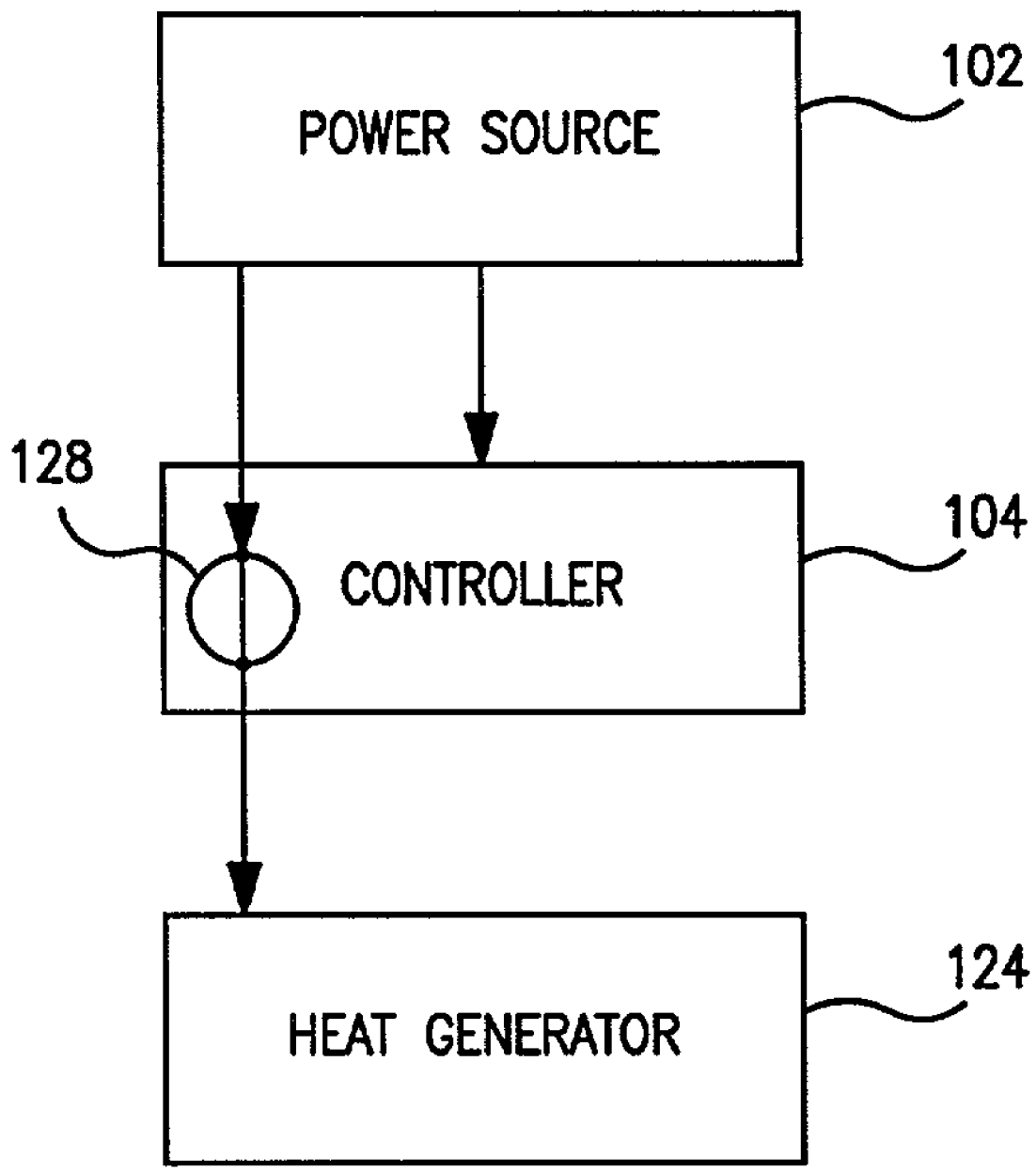
FIG. 1a is a schematic of a system for powering up a controller according to an embodiment of the present invention.
Figure 3:
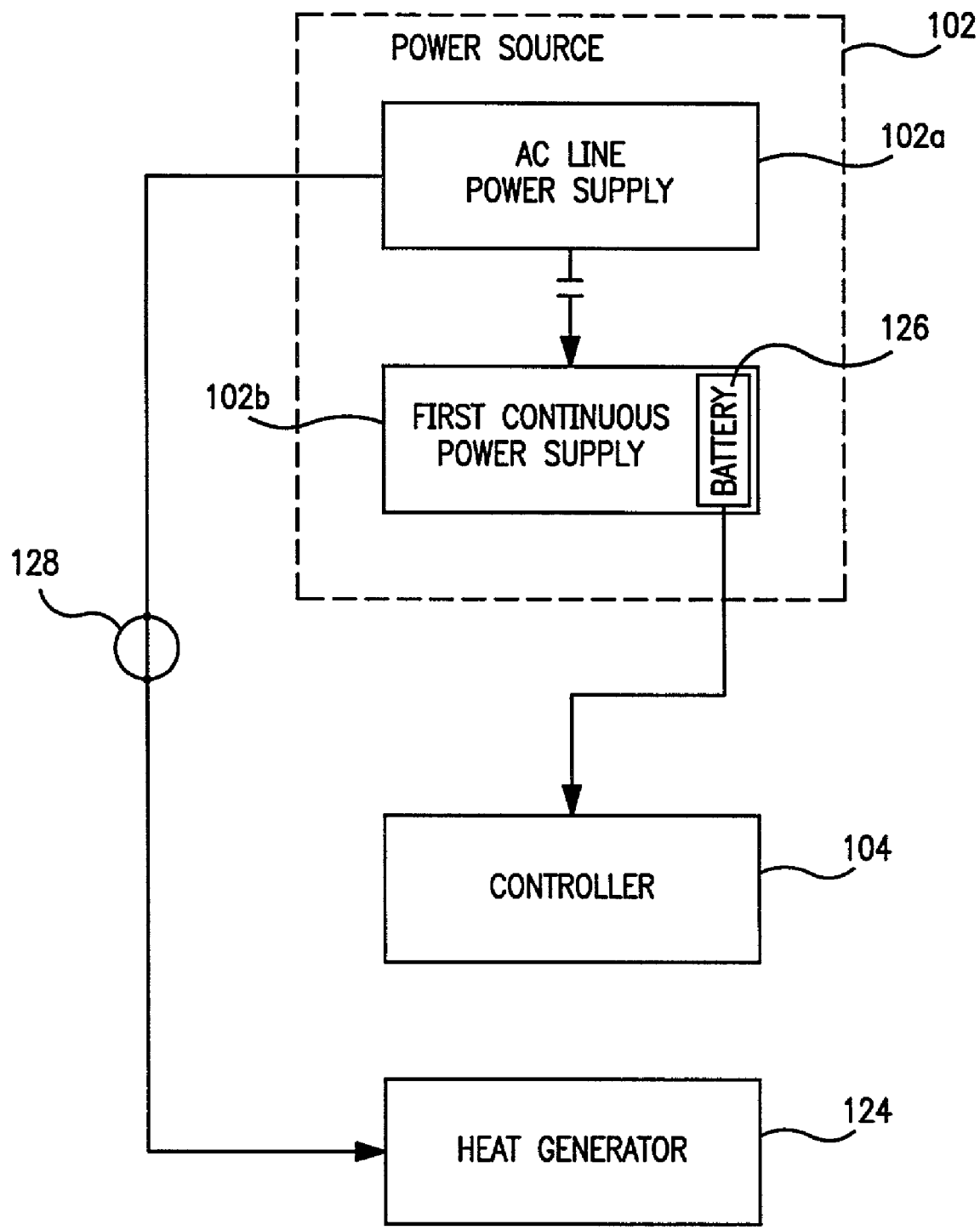
FIG. 3 is a schematic of a system for powering up a controller according to an embodiment of the present invention.
Figure 3A:
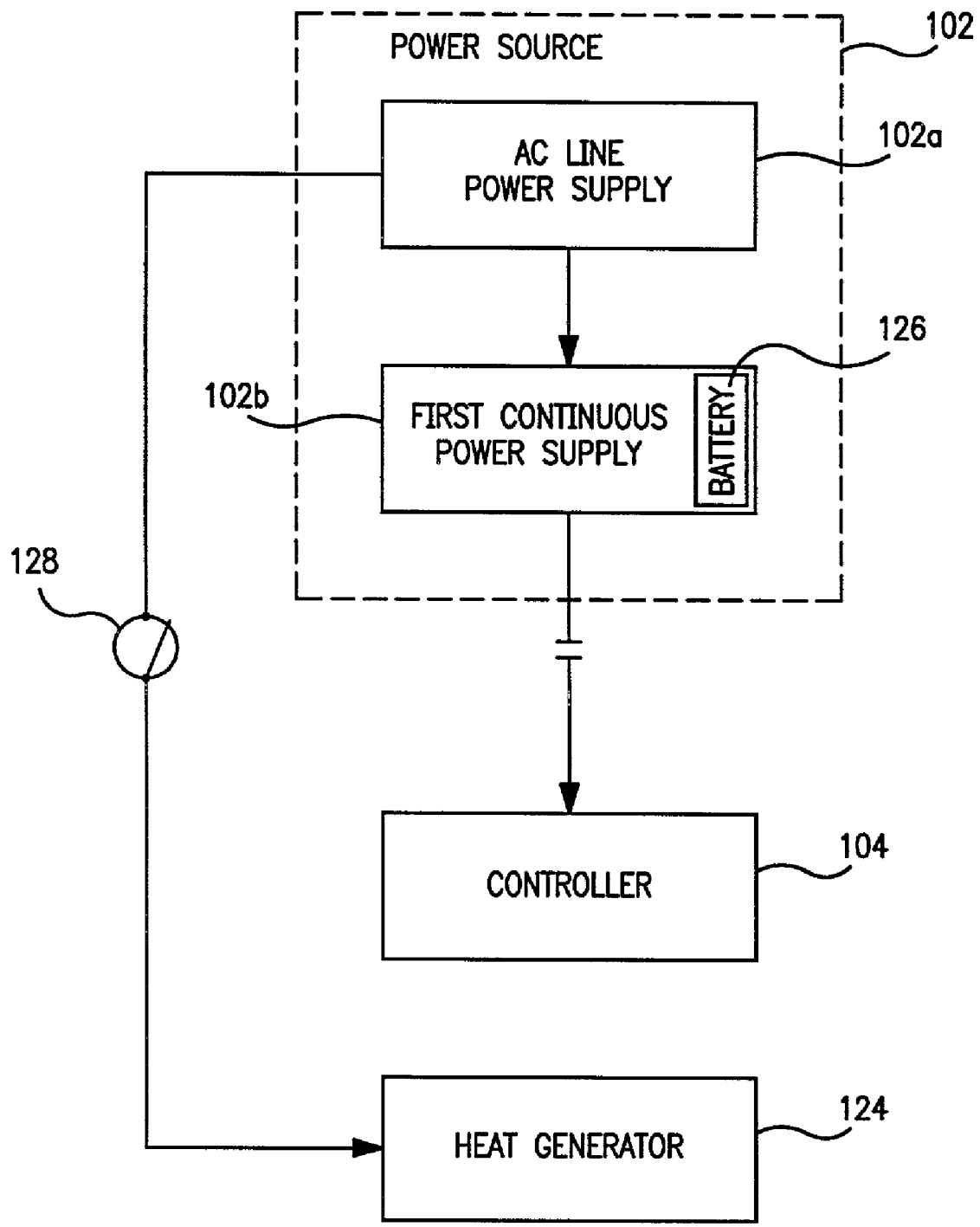
FIG. 3a is a schematic of a system for powering up a controller according to an embodiment of the present invention.

Referring to FIG. 1, a system 100 for powering up a controller according to an embodiment of the present invention is described. System 100 may include a power source 102 and a controller 104, in which controller 104 may be adapted to receive power from power source 102. Controller 104 also may be adapted to detect a power interruption from power source 102 to controller 104. In one embodiment of the invention, system 100 further may include heat generator 124, which may be at least one gas valve, or may be a heating coil, or the like. Heat generator 124 may be adapted to receive power from power source 102 and also may be adapted to provide heat, which, for example, may be used to cook a food product. System 100 also may include switching means 128, which may be a switch, a relay, or the like, and which may control a power flow from power source 102 to heat generator 124. Switching means 128 may be positioned in a remote location outside controller 104, or alternatively, as shown in FIG. 1a, may be located inside controller 104. In each of the above-described embodiments, as shown in FIG. 3a, when there is a power interruption from power source 102 to controller 104, switching means 128 may open, such that there also may be a power interruption from power source 102 to heat generator 124.

Figure 2:
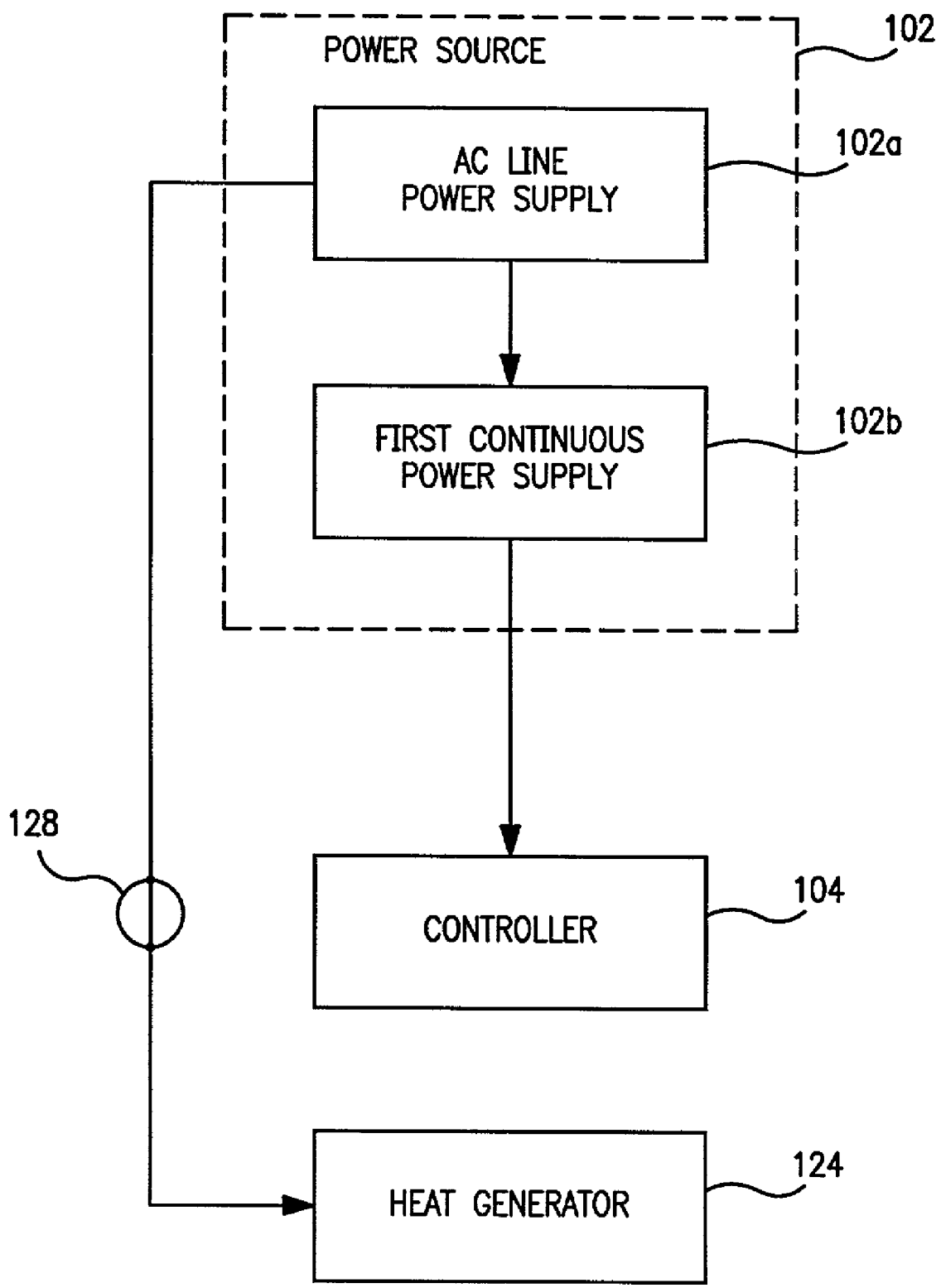
FIG. 2 is a schematic of a system for powering up a controller according to an embodiment of the present invention.
Figure 8:
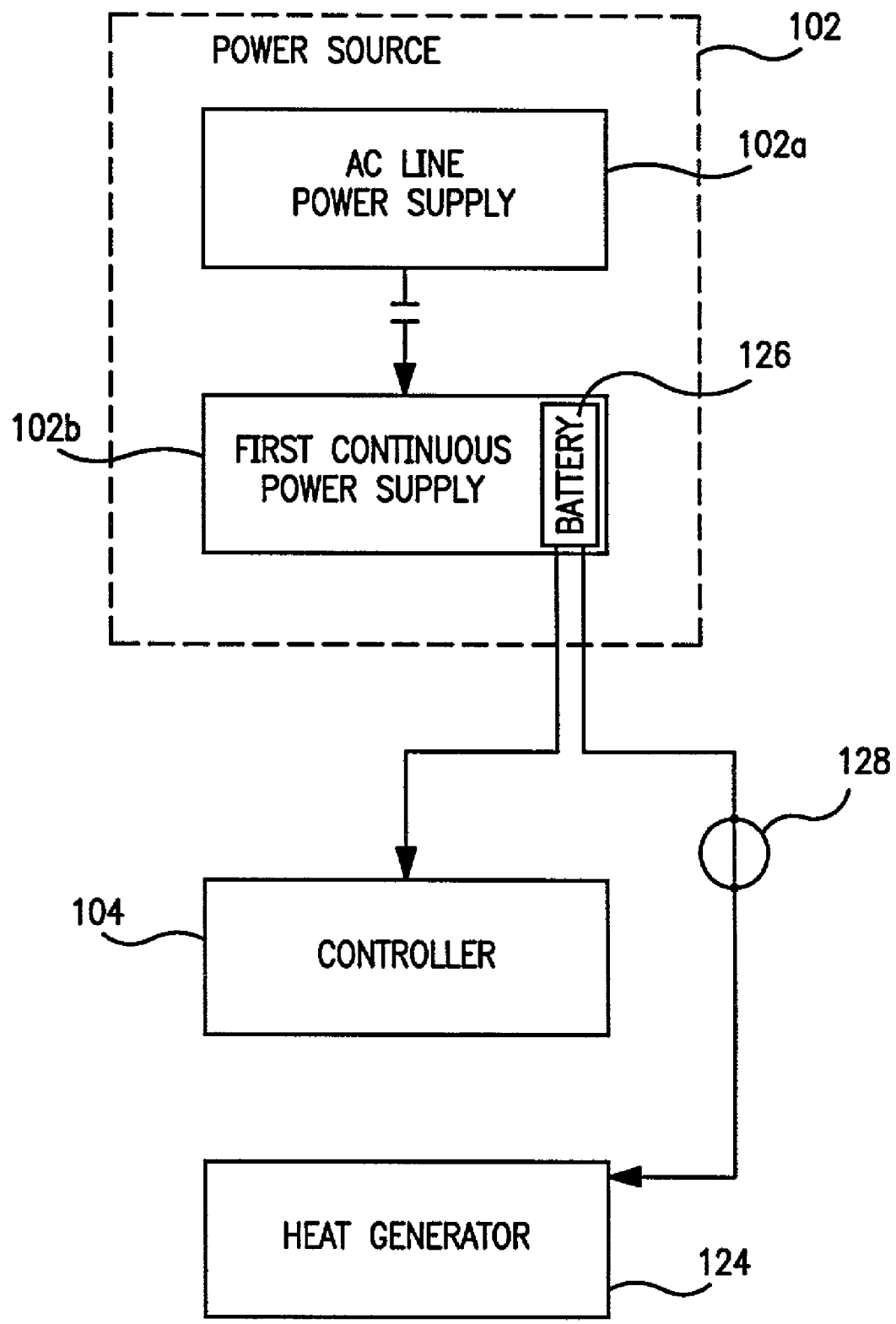
FIG. 8 is a schematic of a system for powering up a controller according to an embodiment of the present invention.

In another embodiment of the present invention, as described in FIG. 2, power source 102 may include an AC line power supply 102a and a first continuous power supply 102b. In this embodiment, first continuous power supply 102b may be adapted to receive power from AC line power supply 102a and controller 104 may be adapted to receive power from first continuous power supply 102b. Moreover, heat generator 124 may be adapted to receive power from ac line power supply 102a, or, as shown in FIG. 8, when heat generator 124 is an electric heat generator, heat generator 124 may be adapted to receive power from first continuous power supply 102b. In yet another embodiment of the present invention, as described in FIG. 3, first continuous power supply 102b may include means for storing at least a portion of the power received from AC line power supply 102a. For example, the means for storing power may be a battery 126, such as a rechargeable battery, or the like. In this embodiment, when there is a power interruption from AC line power supply 102a to first continuous power supply 102b, controller 104 may receive power from battery 126.

Figure 4:
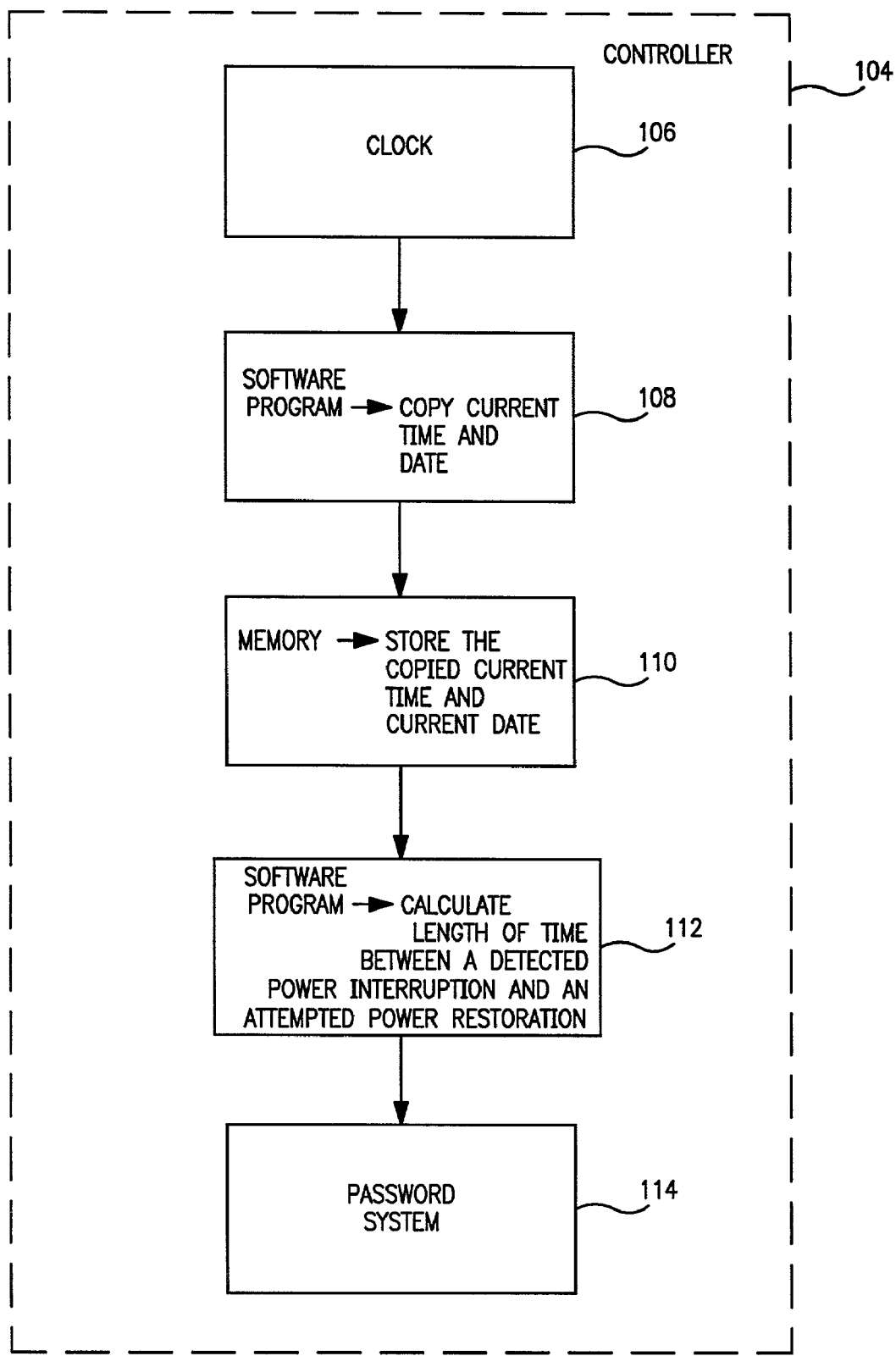
FIG. 4 is a schematic of the controller depicted in any one of FIGS. 1-3 according to an embodiment of the present invention.
Figure 5:
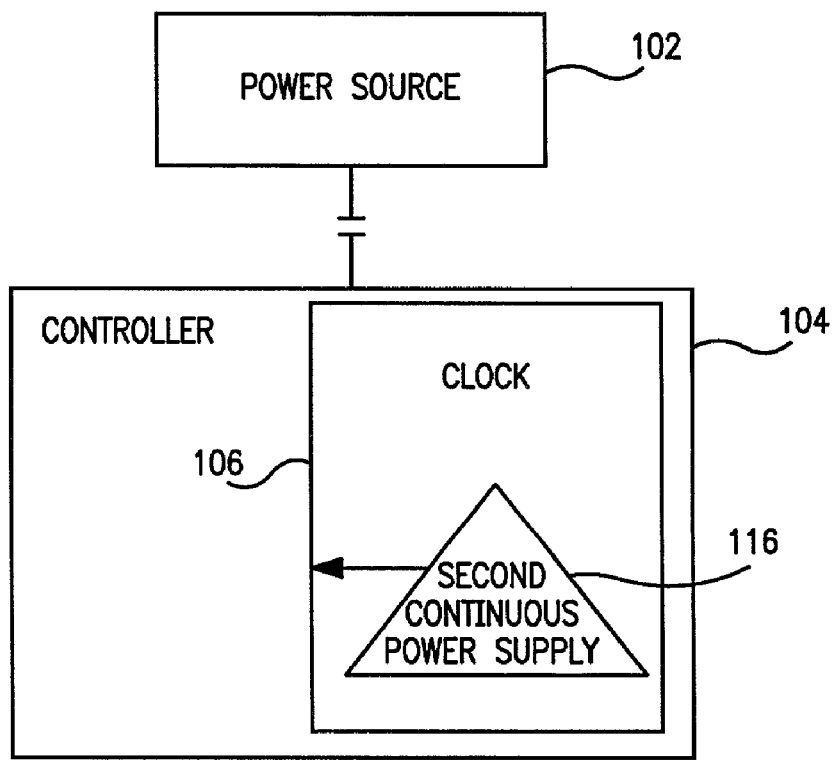
FIG. 5 is a schematic of a system for powering up a clock of the controller depicted in FIG. 4 according to an embodiment of the present invention.
Figure 6:
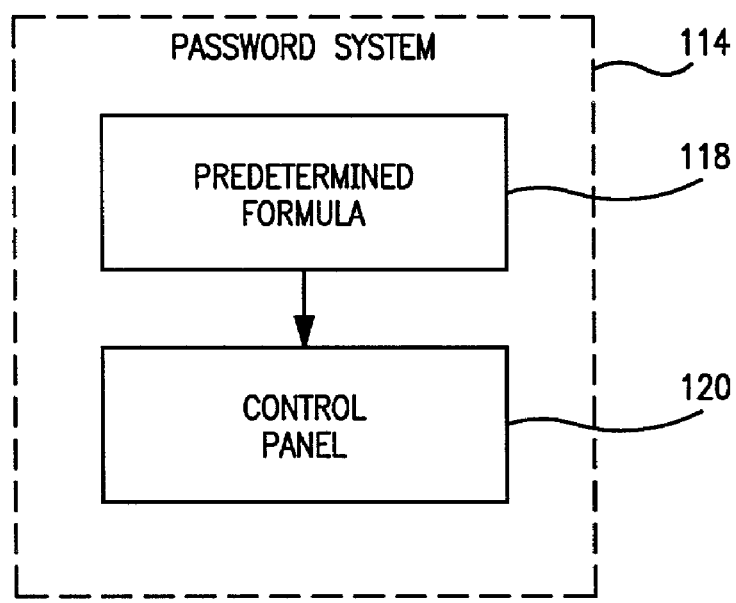
FIG. 6 is a schematic of a password system of the controller depicted in FIG. 4 according to an embodiment of the present invention.

Referring to FIG. 4, in each of the above-described embodiments, controller 104 may include a clock 106 for continuously monitoring a current time and a current date. In one embodiment of the invention, as described in FIG. 5, clock 106 may include a second continuous power supply 116. In this embodiment, as shown in FIGS. 3a and 5, when there is a power interruption from power source 102 to controller 104, clock 106 may be powered by second continuous power supply 116. Second continuous power supply 116 may be a battery, rechargeable battery, a capacitor, or the like. Controller 104 further may include means for copying the current time and the current date, such as first software program 108, in which software program 108 may copy the current time and the current date monitored by clock 106. In one embodiment of the present invention, the current time and the current date may be copied by software program 108 at a predetermined interval of time, and the predetermined interval of time may be every second. Controller 104 also may include a means for storing the copied current time and the copied current date, such as a memory 110. In one embodiment, memory 110 may be a random access memory, which may be a non-volatile random access memory. The copied current time and the copied current date may be stored in memory 110 at the predetermined time interval. Controller 104 further may include a second software program 112, which may calculate a length of time between the detected power interruption from power source 102 to controller 104 and a power restoration from power source 102 to controller 104. Moreover, in one embodiment, the copied current time and the copied current date may not be stored in memory 110 during the length of time between the detected power interruption from power source 102 to controller 104 and the power restoration from power source 102 to controller 104. In this embodiment, the length of time may be calculated by a calculating means, such as a software program 112, which may be loaded into a general purpose computer, which calculates the difference between the current time for the current date and the copied current time for the copied current date most recently stored in memory 110.

Controller 104 further may comprise means for preventing unauthorized power restoration from power source 102 to heat generator 104 when the length of time between the detected power interruption from power source 102 to controller 104 and the power restoration from power source 102 to controller 104 is greater than a predetermined length of time. Controller 104 also may include means for restoring power from power source 102 to heat generator 104 when the length of time is greater than the predetermined length of time. In one embodiment, the predetermined length of time may be between about 30 minutes and about 3 hours, or more preferably, about 2 hours. The means for preventing unauthorized power restoration and for restoring power when the length of time is greater than the predetermined length of time may be password system 114.

Password system 114 may include predetermined formula 118 and a control panel 120. A predetermined formula 118 may be created by an owner of controller 104, and may be used to generate a control password, which may be either a numerical password or an alphanumeric password. In addition, predetermined formula 118 may include at least one constant term and also may include at least one variable term. For example, predetermined formula 118 may be $aS+bY+cM+d$, in which a, b, c, and d may be predetermined constant terms, S may be the serial number for controller

104, Y may be the current year, and M may be the current month. When the control password is numeric, the control password also may be modified by converting the control password generated by predetermined formula 118 from a base 10 number system to an another base number system. The base number system to which the control password may be converted may depend on a number of numeric keys located on control panel 120. For example, if control panel 120 includes 6 numeric keys, then the control password may be converted from a base 10 number system to a base 5 number system. Moreover, if control panel 120 does not include a numeric key corresponding to the number zero, each of the individual numbers of the control password may be increased by one. In yet another embodiment, the control password may change, and a new control password may be generated using predetermined formula 118, after the expiration of a predetermined period of time. The predetermined period of time may be about 1 month, and the new control password may be generated in a manner substantially similar as in the above-described embodiments.

Figure 7:
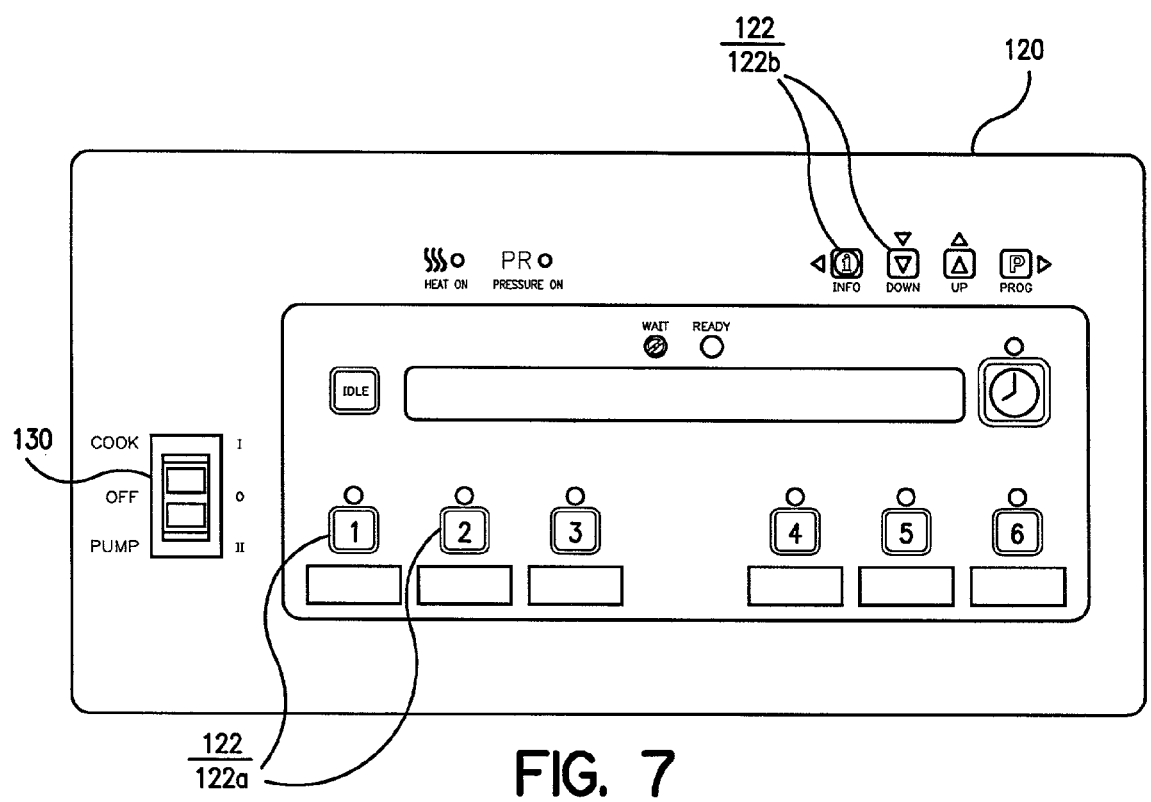
FIG. 7 is a schematic of a control panel of the password system depicted in FIG. 6 according to an embodiment of the present invention.

Referring to FIG. 7, control panel 120 may include an on/off switch 130. Moreover, controller 104 may continue to receive power when switch 130 is in an off position. Control panel 120 also may include a plurality of keys 122, and keys 122 may include numerical keys 122a and also may include function keys 122b. In one embodiment of the invention, at least one function key 122b may have a predetermined function associated with it. For example, the predetermined function may be displaying information on control panel 120; displaying the date the control password was generated; or displaying the date the new control password was generated. In addition, in this embodiment, the function associated with function key may be performed by pressing function key 122b and may be performed after power restoration from power source 102 and controller 104 and before power restoration from power source 102 to heat generator 124.

Password system 118 further may include means for entering an access password. The means for entering a password may be keys 122, in which a password may be entered by pressing keys 122. Moreover, in each of the above-described embodiments, if the entered access password matches the control password, then switching means 128 may close and power may be restored from power source 102 to heat generator 104. Likewise, if the entered access password does not match the control password, then switching means 128 may remain open and power may not be restored from power source 102 to heat generator 124.

Figure 9:
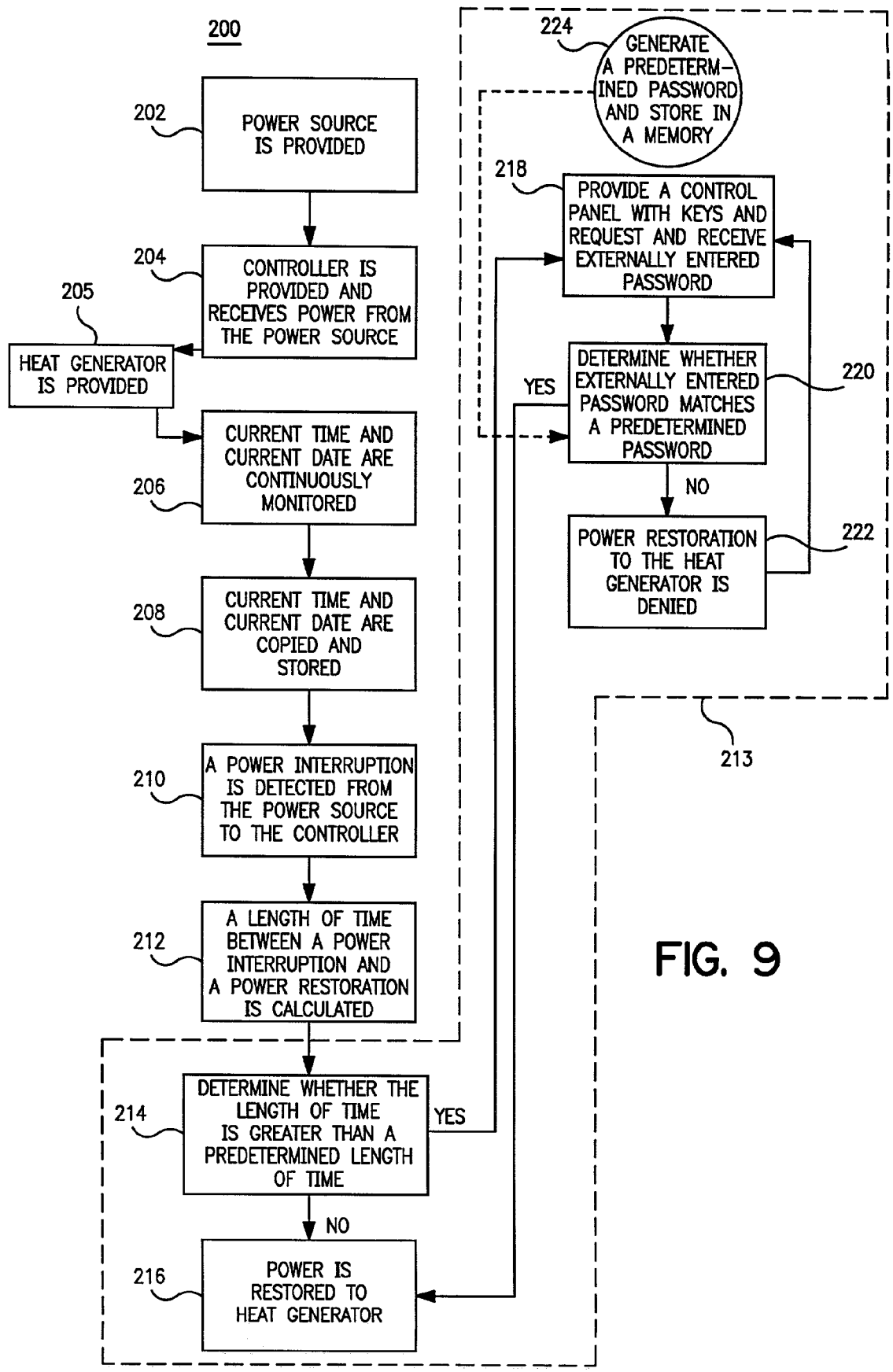
FIG. 9 is a flow chart for a method of powering up a controller according to an embodiment of the present invention.
Figure 10:
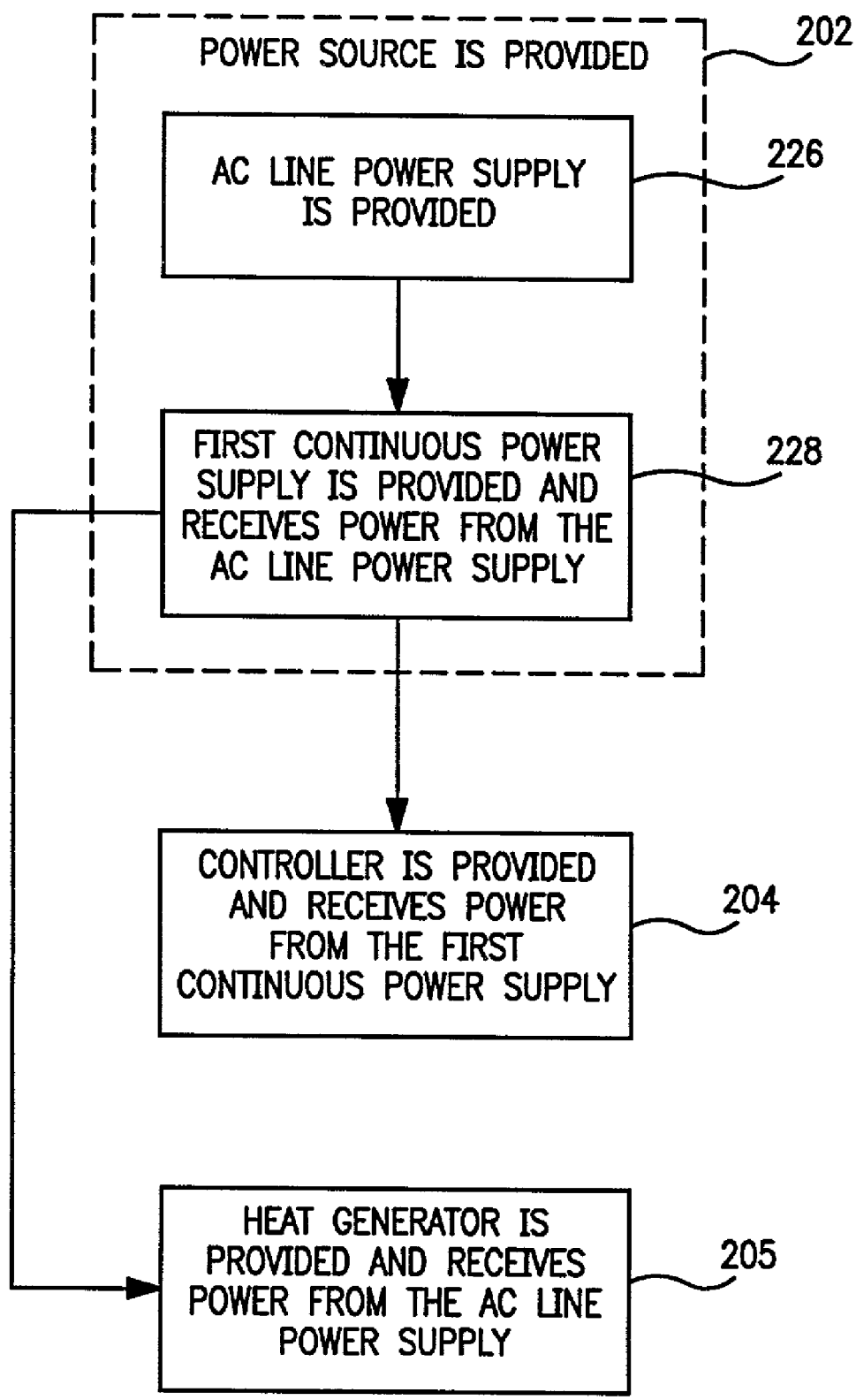
FIG. 10 is a flow chart for a method of powering up a controller according to an embodiment of the present invention.

Referring to FIG. 9, a method 200 for powering up a controller according to an embodiment of the invention is described. In step 202, power source 102 may be provided and in step 204 controller 104 also may be provided, in which controller 104 may be adapted to receive power from power source 102. Controller 104 also may be adapted to detect a power interruption from power source 102 to controller 104. In another embodiment of the present invention, as described in FIG. 10, step 202 further may include steps 226 and 228. In step 226, AC line power supply 100a may be provided, and in step 228, first continuous power supply 100b may be provided. In this embodiment, first continuous power supply 100b may be adapted to receive power from AC line power supply 100a and controller 104 may be adapted to receive power from continuous power supply 100b. In yet another embodiment, first continuous power supply 102b may include means for storing at least a portion of the power received from AC line power supply 102a. For example, the means for storing power may be battery 126, such as a rechargeable battery, or the like. In this embodiment, when there is a power interruption from AC line power supply 102a to first continuous power supply 102b, controller 104 may receive power from battery 126.

In step 205, each of the above-described embodiments of the invention further may include the step of providing a heat generator 124, which may be at least one gas valve, or, alternatively, may be a heating coil, or the like. Heat generator 124 may be adapted to receive power from power source 102, and also may be adapted to provide heat, which, for example, may be used to cook a food product. In another embodiment of the present invention, as described in FIG. 10, heat generator 124 may be adapted to receive power from AC line power supply 102a. In addition, in this embodiment, system 100 also may include a switching means 128, which may be a switch, a relay, or the like, which may control a power flow from power source 102 to heat generator 124. Switching means 128 may be positioned in a remote location outside controller 104, or alternatively, as shown in FIG. 1a, may be located inside controller 104. In this embodiment, as shown in FIG. 3a, when there is a power interruption from power source 102 to controller 104, switching means 128 may open, such that there also may be a power interruption from power source 102 to heat generator 124.

In step 206, a current time and current date may be continuously monitored. The current time and the current date may be continuously monitored by clock 106. In one embodiment of the invention clock 106 may include a second continuous power supply 116. In this embodiment, when there is a power interruption from power source 102 to controller 104, clock 106 may be powered by second continuous power supply 116. Second continuous power supply 116 may be a battery, rechargeable battery, a capacitor, or the like. In step 208, the current time and the current date may be copied and the copied current time and the copied current date may be stored. The current time and the current date may be copied by first software program 108 and may be stored in memory 110. Memory 110 may be a random access memory, which may be a non-volatile random access memory. In one embodiment of the present invention, the current time and the current date may be copied at a predetermined interval of time, and the predetermined interval of time may be every second. Moreover, the copied current time and the copied current date may be stored in memory 110 at the predetermined time interval.

In step 210, the power interruption from power source 102 to controller 104 may be detected. In one embodiment, the power interruption may be detected by controller 104. In step 212, a length of time between the power interruption from power source 102 to controller 104 and a power restoration from power source 102 to controller may be calculated. In one embodiment, the length of time may be calculated by a calculating means 112. Moreover, in another embodiment, the copied current time and the copied current date may not be stored in memory 110 during the length of time between the detected power interruption from power source 102 to controller 104 and the power restoration from power source 102 to controller 104. In this embodiment, the length of time may be calculated by calculating means 112, such as a software program loaded into a general purpose computer or processor which calculates the difference between the current time for the current date and the copied current time for the copied current date most recently stored in memory 110.

In step 213, unauthorized power restoration from power source 102 to heat generator 124 may be prevented when the length of time between the detected power interruption from power source 102 to controller 104 and the power restoration from power source 102 to controller 104, is greater than a predetermined length of time. Similarly, in step 213, power may be restored from power source 102 to heat generator 124 when the length of time is greater than the predetermined length of time, if such power restoration is authorized. Step 213 may include steps 214, 216, 218, 220, and 224. In step 214, controller 104 may determine whether the length of time is greater than the predetermined length of time. In one embodiment, the predetermined length of time may be between about 30 minutes and about 3 hours, or, more preferentially, about 2 hours. In step 216, if the length of time is less than or equal to the predetermined length of time, power from power source 102 to heat generator 124 may be restored when power from power source 102 to controller 104 is restored.

Alternatively, in step 218, if the length of time is greater than the predetermined length of time, then power may not be restored to from power source 102 to heat generator 124. In step 218, control panel 120 may be provided. Control panel 120 may include on/off switch 130 and controller 104 may continue to receive power when switch 130 is in the off position. Control panel 120 also may include keys 122, which may include number keys 122a. Moreover, in step 218, controller 104 may receive an externally entered access password. The password may be received when an external user presses at least one of keys 122.

Figure 11:
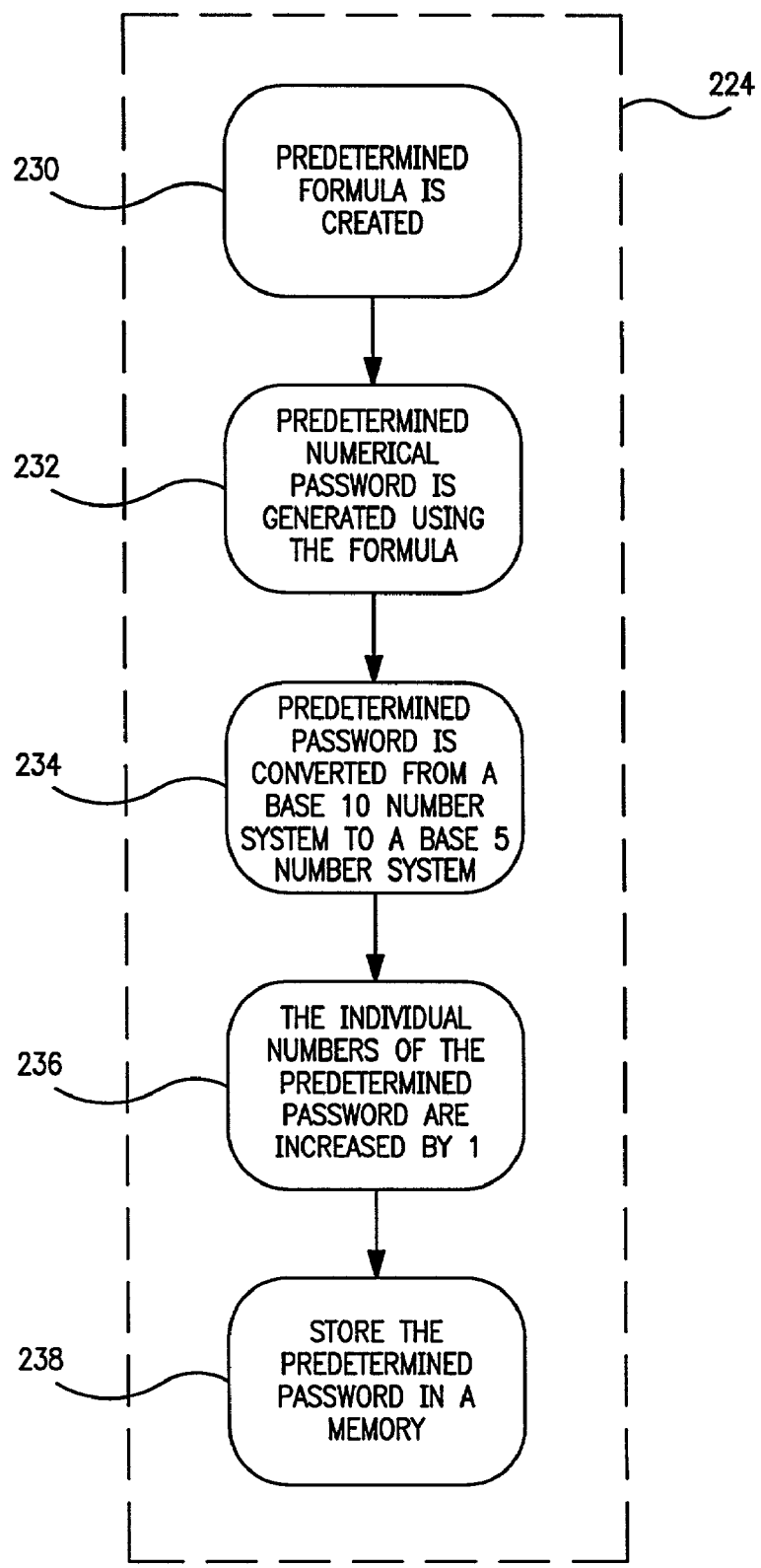
FIG. 11 is a flow chart for a method of generating a control password for the method depicted in either FIG. 9 or FIG. 10 according to an embodiment of the present invention.

In step 220, controller 104 may determine whether the entered access password matches a control password. Referring to FIG. 11, a method of generating a control password is described. In step 224, the control password may be created. Step 224 may include steps 230, 232, 234, 236, and 238. In step 230, predetermined formula 118 is created. Predetermined formula 118 may be created by an owner of controller 104, and in step 232, may be used to generate a control password, which may be either a numerical password or an alphanumeric password. Predetermined formula 118 may include at least one constant term and also may include at least one variable term. For example, predetermined formula 118 may be $aS+bY+cM+d$, in which a, b, c, and d may be predetermined constant terms, S may be the serial number for controller 104, Y may be the current year, and M may be the current month. When the control password is numeric, in step 234, the control password also may be modified by converting the control password generated by predetermined formula 118 from a base 10 number system to an another base number system. The base number system may depend on a number of numeric keys 122b located on control panel 120. For example, if control panel 120 includes 6 numeric keys, then the control password may be converted from a base 10 number system to a base 5 number system. Moreover, if control panel 120 does not include a numeric key corresponding to the number zero, in step 236, each of the individual numbers of the control password may be increased by one. In yet another embodiment, the control password may change, and a new control password may be generated using predetermined formula 118, after the expiration of a predetermined period of time. The predetermined period of time may be about 1 month, and the new control password may be generated in a manner substantially similar as in the above-described embodiments. Moreover, in step 238, the control password, or alternatively, the new control password, may be stored in a memory.

In step 220, if the externally entered access password matches the control password, then in step 216 power may be restored from power source 102 to heat generator 124. Alternatively, if the externally entered access password does not match the control password, then power restoration is denied, and the method may return to step 218 and controller 104 may receive another externally entered access password.

Figure 12:
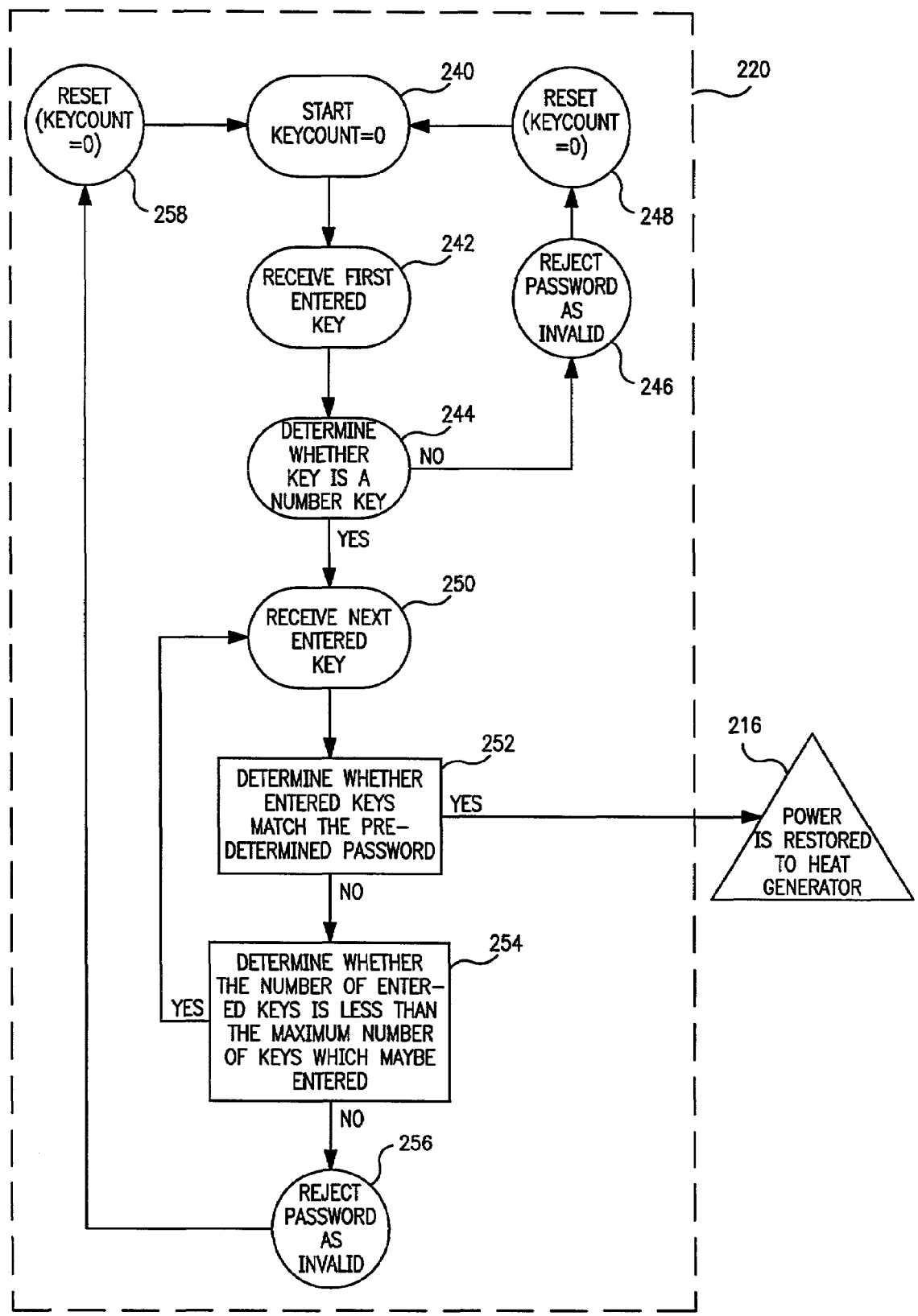
FIG. 12 is a flow chart for a method of determining whether an entered access password matches the control password depicted in FIG. 11 according to an embodiment of the present invention.

Referring to FIG. 12, an example of a method for determining whether the entered access password matches the control password according to any one of the above-described embodiments is shown. In step 240, controller 104 has not yet received the externally entered access password and the key count is zero. In step 242, the first entered key may be received. In step 244, the program may determine whether the entered key is a number key. In step 246, if the entered key is not a number key, then the password may be rejected as invalid. If the password is rejected as invalid, in step 248 the program may be reset, the key count may return to zero, and the program may return to step 240. Alternatively, if the entered key is a numeric key, in step 250 the next entered key may be received. In step 252, the program may determine whether the entered keys match the control password. In step 216, if the entered keys match the control password, then power may be restored from power source 102 to heat generator 124. Alternatively, in step 254, if the entered keys do not match the control password, the program may determine whether a number of entered keys is less than a predetermined maximum number of keys which may be entered. If the number of entered keys is less than the predetermined maximum number of keys, the program may return to step 250 and receive the next entered key. Alternatively, if the number of entered keys is not less than the maximum number of keys, in step 256 the entered access password may be rejected, in step 258 the program may reset, and the program may return to step 240.

Figure 13:
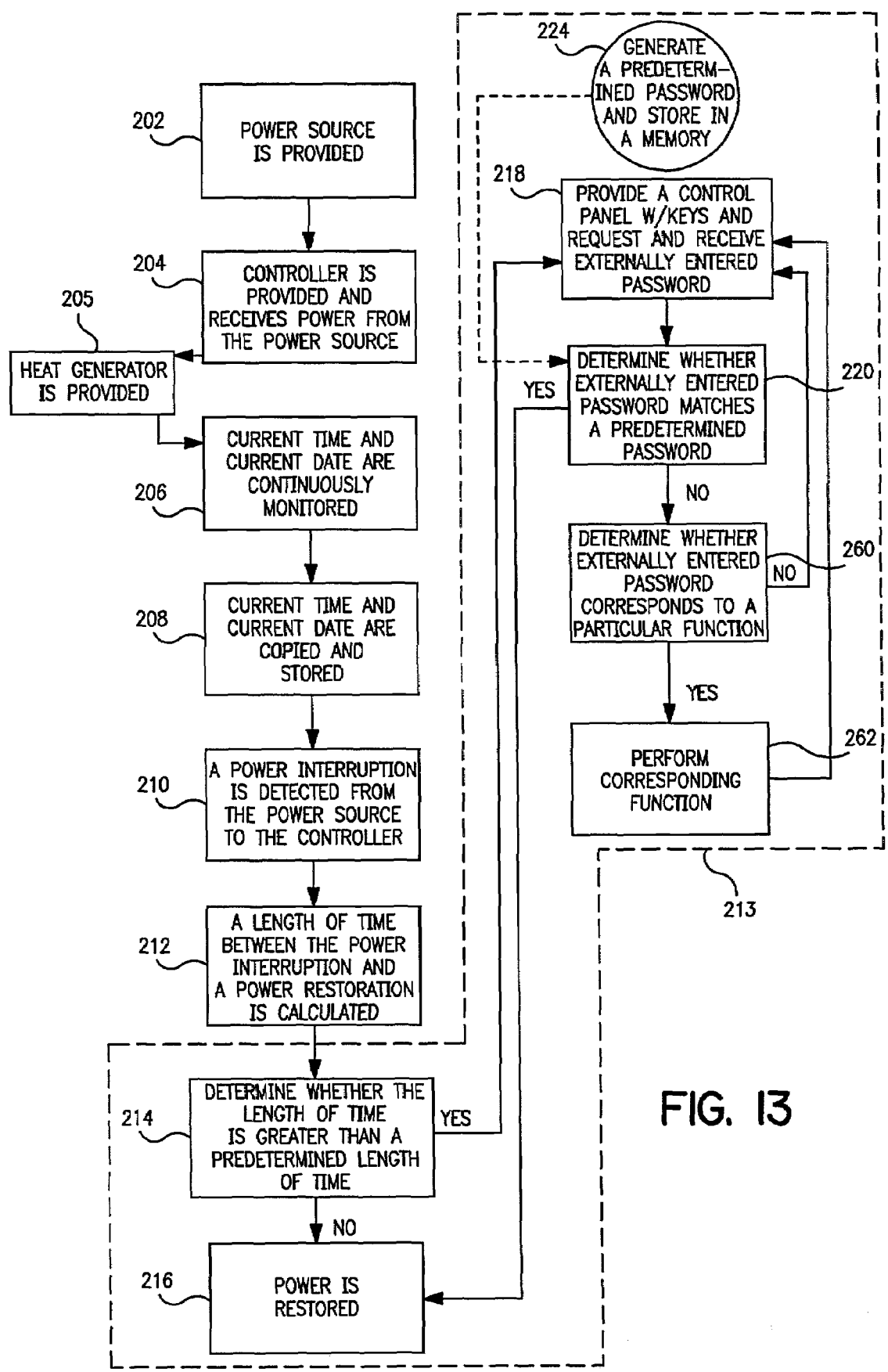
FIG. 13 is a flow chart for a method of powering up a controller according to an embodiment of the present invention.

Referring to FIG. 13, a method for powering up a controller according to another embodiment of the invention is described. The steps of this embodiment are substantially similar to those steps of the above-described embodiments. Therefore, the differences between this embodiment and the above-described embodiments will now be described.

In this embodiment, control panel 120 also may include function keys 122b. In one embodiment of the invention, at least one function key 122b may have a predetermined function associated with it. For example, the predetermined function may be displaying information on control panel 120; displaying the date the control password was generated; or displaying the date the new control password was generated. In addition, in this embodiment, the function associated with function key may be performed by pressing function key 122b and may be performed after power restoration from power source 102 and controller 104 but before power restoration from power source 102 to heat generator 124. In step 260, the method further may include determining whether the externally entered access password corresponds to one of the predetermined functions. In step 262, if the externally entered access password corresponds to one of the predetermined functions, the function may performed, and the method may return to step 218 and another externally entered access password may be received.

Figure 14:
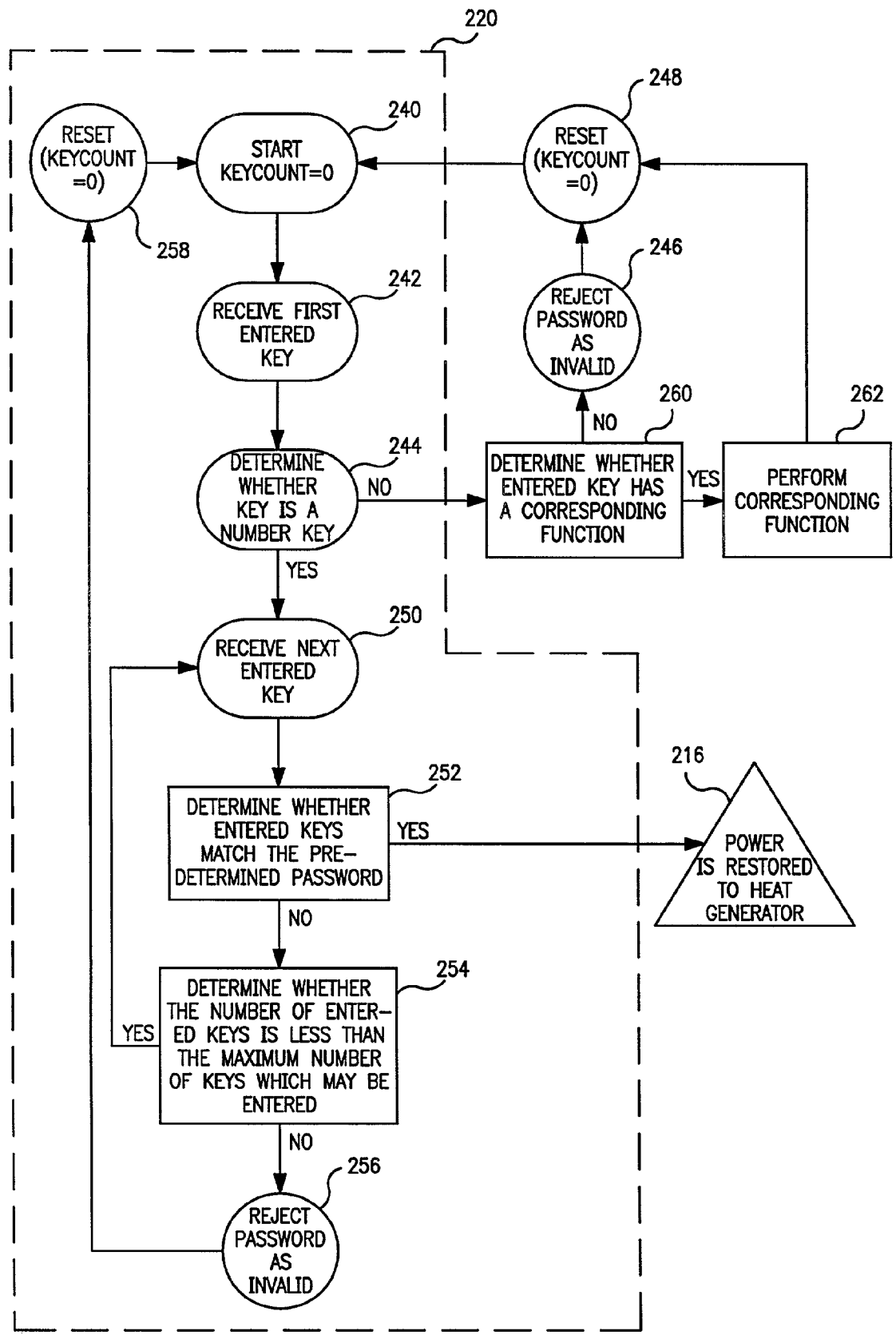
FIG. 14 is a flow chart for a method of determining whether an entered access password matches the control password depicted in FIG. 11 for the method depicted in FIG. 13 according to an embodiment of the present invention.

Referring to FIG. 14, an example of a method for determining whether the entered access password matches the control password according to the method described in FIG. 13 is shown. The steps of this embodiment are substantially similar to those steps of the embodiment shown in FIG. 12. Therefore, the differences between this embodiment and the embodiment shown in FIG. 12 will now be described. In step 244, the program may determine whether the entered key is numeric key. If the entered key is not a numeric key, in step 260 the program may determine whether the entered key has a corresponding predetermined function. If the entered key has a corresponding predetermined function, in step 262 the corresponding function may be performed, and in step 248 the program may reset and return to step 240. Alternatively, if the entered key does not have a corresponding function, in step 246, the entered access password may be rejected as invalid, and in step 248, the program may reset and return to step 240.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein.

What is claimed is:

1. A system for powering up a controller comprising:
   a power source;
   a heat generator adapted to receive power from said power source; and
   a controller adapted to receive power from said power source and adapted to detect a power interruption from said power source to said controller, wherein said controller comprises:
   a clock for continuously monitoring a current time and a current date;
   means for copying and storing said current time and said current date;
   means for calculating a length of time between said detected power interruption from said power source to said controller and a power restoration from said power source to said controller;
   means for preventing unauthorized power restoration from said power source to said heat generator when said length of time is greater than a predetermined length of time and for restoring power from said power source to said heat generator when said length of time is less than or equal to said predetermined length of time; and
   means for restoring power from said power source to said heat generator when said length of time is greater than said predetermined length of time wherein said means for restoring power from said power source to said heat generator comprises a password system, wherein said password system comprises means for generating a control password and means for entering an access password, wherein said power is restored when said entered access password matches said control password, wherein said means for generating a control password comprises a predetermined formula, wherein said predetermined formula comprises a plurality of terms and at least one of said terms is a variable term, wherein said control password is numerical and is converted from a base ten number system to a base five number system.

2. The system of claim 1, further comprising switching means, wherein said switching means controls a power flow from said power source to said heat generator and said power flow is interrupted when said controller detects said power interruption from said power source to said controller.

3. The system of claim 1, wherein said heat generator is either at least one gas valve or at least one heater element.

4. The system of claim 1, wherein said predetermined length of time is between about thirty minutes and about three hours.

5. The system of claim 4, wherein said predetermined length of time is about two hours.

6. The system of claim 1, wherein said means for entering a password comprises a control panel, said control panel comprising a plurality of keys and said password is entered by pressing at least one of said keys.

7. The system of claim 1, wherein said control password comprises a plurality of numbers and each of the individual numbers of said control password are increased by one.

8. The system of claim 7, wherein a new control password is generated after the expiration of a predetermined period of time using said predetermined formula.

9. The system of claim 8, wherein said new control password is converted from a base ten number system to a base five number system.

10. The system of claim 9, wherein said new control password comprises a plurality of numbers and each of the individual numbers of said new control password are increased by one.

11. The system of claim 10, wherein said predetermined period of time is one month.

12. The system of claim 10, wherein at least one function is associated with at least one of said keys, wherein said function is performed by pressing said key.

13. The system of claim 12, wherein said function is performed during said power flow interruption from said power source to said heat generator.

14. The system of claim 13, wherein said function is selected from the group consisting of displaying information on said control panel and displaying a generation date of said new control password.

15. The system of claim 1, wherein said power source comprises:
    an AC line power supply; and
    a first continuous power supply, wherein said first continuous power supply is adapted to receive power from said AC line power supply and said controller is adapted to receive power from said first continuous power supply.

16. The system of claim 15, wherein said first continuous power supply comprises means for storing power, wherein said controller receives said stored power from said first continuous power supply when a power interruption is detected from said AC line power supply to said first continuous power supply.

17. The system of claim 16, wherein said means for storing power comprises a battery.

18. The system of claim 17, wherein said means for entering a password comprises a control panel, wherein said control panel comprises an on/off switch.

19. The system of claim 18, wherein said controller continues to receive power from said continuous power supply when said switch is in an off position.

20. The system of claim 19, wherein said clock comprises a second continuous power supply, wherein said clock receives power from said second continuous power supply when said power interruption is detected from said power source to said controller.

21. The system of claim 20, wherein said second continuous power supply is either a battery or a capacitor.

22. The system of claim 21, wherein said means for storing said current time and said current date is a random access memory.

23. The system of claim 22, wherein said memory is a non-volatile random access memory.

24. The system of claim 23, wherein said current time and said current date are stored in said random access memory at a predetermined interval.

25. The system of claim 24, wherein said predetermined interval is about 1 second.

26. The system of claim 24, wherein said current time and said current date are not stored in said random access memory during said length of time between said power interruption from said power source to said controller and said power restoration from said power source to said controller.

27. The system of claim 26, wherein said length of time between said power interruption from said power source to said controller and said power restoration from said power source to said controller is a difference between said current time for said current date and said current time for said current date most recently stored in said random access memory.

28. The system of claim 27, wherein said predetermined length of time is between about thirty minutes and about three hours.

29. The system of claim 28, wherein said predetermined length of time is about two hours.

30. The system of claim 27, wherein said control panel comprises a plurality of keys and said password is entered by pressing at least one of said keys.

31. The system of claim 30, wherein said means for generating a control password comprises a predetermined formula, wherein said predetermined formula comprises a plurality of terms and at least one of said terms is a variable term.

32. The system of claim 31, wherein said control password is numerical and is converted from a base ten number system to a base five number system.

33. The system of claim 32, wherein said control password comprises a plurality of numbers and each of the individual numbers of said control password are increased by one.

34. The system of claim 33, wherein a new control password is generated after the expiration of a predetermined period of time using said predetermined formula.

35. The system of claim 34, wherein said new control password is converted from a base ten number system to a base five number system.

36. The system of claim 35, wherein said new control password comprises a plurality of numbers and each of the individual numbers of said new control password are increased by one.

37. The system of claim 36, wherein said predetermined period of time is one month.

38. The system of claim 36, wherein at least one function is associated with at least one of said keys, wherein said function is performed by pressing said key.

39. The system of claim 38, wherein said function is performed during said power flow interruption from said power source to said heat generator.

40. The system of claim 39, wherein said function is selected from the group consisting of displaying information on said control panel and displaying a generation date of said new control password.

41. A method for powering up a controller comprising the steps of:
providing a power source;
providing a heat generator;
providing a controller, wherein said controller receives power from said power source;
detecting a power interruption from said power source to said controller;
continuously monitoring a current time and a current date;
copying and storing said current time and said current date;
calculating a length of time between said detected power interruption from said power source to said controller and a power restoration from said power source to said controller;
preventing unauthorized power restoration from said power source to said heat generator when said length of time is greater than a predetermined length of time;
restoring power from said power source to said heat generator when said length of time is less than or equal to said predetermined length of time; and
restoring power from said power source to said heat generator when said length of time is greater than said predetermined length of time, wherein the step of restoring power from said power source to said heat generator comprises the steps of:
generating a control password; and
receiving an externally entered access password, wherein said power is restored when said entered access password matches said control password, wherein the step of generating said control password comprises the step of creating a predetermined formula, wherein said predetermined formula generates a predetermined numerical password, wherein the step of generating said control password further comprises the step of converting said control password from a base ten number system to a base five number system.

42. The method of claim 41, further comprising the step of providing a switching element, wherein said switching element controls a power flow from said power source to said heat generator and said power flow is interrupted when said power interruption from said power source to said controller is detected.

43. The method of claim 42, wherein said heat generator is either at least one gas valve or at least one heating element.

44. The method of claim 41, wherein said predetermined length of time is between about thirty minutes and about three hours.

45. The method of claim 44, wherein said predetermined length of time is about two hours.

46. The method of claim 41, wherein the step of receiving an externally entered access password comprises the step of providing a control panel comprising a plurality of keys and said password is entered by pressing at least one of said keys.

47. The method of claim 41, wherein said control password comprises a plurality of numbers and the step of generating said control password further comprises the step of increasing each of the individual numbers of said control password by one.

48. The method of claim 47, wherein the step of generating said control password further comprises the step of generating a new control password after the expiration of a predetermined period of time using said predetermined formula.

49. The method of claim 48, wherein the step of generating said new control password further comprises the step of converting said new control password from a base ten number system to a base five number system.

50. The method of claim 49, wherein the new control password comprises a plurality of numbers and the step of generating said new control password further comprises the step of increasing each of the individual numbers of said new control password by one.

51. The method of claim 50, wherein said predetermined period of time is one month.

52. The method of claim 51, wherein the step of providing a control panel comprises the step of creating at least one function associated with at least one of said keys, wherein said function is performed by pressing said key.

53. The method of claim 52, wherein the step of creating at least one function comprises the step of performing said function during said power flow interruption from said power source to said heat generator.

54. The method of claim 53, wherein said at least one function is selected from the group consisting of displaying information on said control panel and displaying a generation date of said new control password.

55. The method of claim 41, wherein the step of providing a power source further comprises the steps of:
providing an AC line power supply; and
providing a first continuous power supply, wherein said first continuous power supply receives power from said AC line power supply and said controller receives power from said first continuous power supply.

56. The method of claim 55, wherein said first continuous power supply comprises means for storing power and said step of providing said first continuous power supply comprises the step of providing said stored power to said controller when a power interruption is detected from said AC line power supply to said first continuous power supply.

57. The method of claim 56, wherein said means for storing power comprises a battery.

58. The method of claim 57, wherein the step of receiving an externally entered access password comprises the step of providing a control panel, said control panel comprising an on/off switch.

59. The method of claim 58, wherein the step of providing a power source further comprises the step of providing power to said controller when said switch is in an off position.

60. The method of claim 59, wherein said current time and said current date are monitored by a clock, wherein said clock comprises a second continuous power supply and said clock receives power from said second continuous power supply when said power interruption is detected from said power source to said controller.

61. The method of claim 60, wherein said second continuous power supply is either a battery or a capacitor.

62. The method of claim 61, wherein the step of storing said current time and said current date comprises the step of storing said current time and said current date in a random access memory.

63. The method of claim 62, wherein said memory is a non-volatile random access memory.

64. The method of claim 63, wherein the step of storing said current time and said current date further comprises the step of storing said current time and said current date in said random access memory at a predetermined interval.

65. The method of claim 64, wherein said predetermined interval is about 1 second.

66. The method of claim 64, wherein said current time and said current date are not stored in said random access memory during said length of time between said power interruption from said power source to said controller and said power restoration from said power source to said controller.

67. The method of claim 66, wherein the step of calculating a length of time between said detected power interruption from said power source to said controller and said power restoration comprises the step of calculating a difference between said current time for said current date and said current time for said current date most recently stored in said random access memory.

68. The method of claim 67, wherein said predetermined length of time is between about thirty minutes and about three hours.

69. The method of claim 68, wherein said predetermined length of time is about two hours.

70. The method of claim 67, wherein said control panel further comprises a plurality of keys and said password is entered by pressing at least one of said keys.

71. The method of claim 70, wherein the step of generating said control password comprises the step of creating a predetermined formula, wherein said predetermined formula generates a predetermined numerical password.

72. The method of claim 71, wherein the step of generating said control password further comprises the step of converting said control password from a base ten number system to a base five number system.

73. The method of claim 72, wherein said control password comprises a plurality of numbers and the step of generating said control password further comprises the step of increasing each of the individual numbers of said control password by one.

74. The method of claim 73, wherein the step of generating said control password further comprises the step of generating a new control password after the expiration of a predetermined period of time using said predetermined formula.

75. The method of claim 74, wherein the step of generating said new control password further comprises the step of converting said new control password from a base ten number system to a base five number system.

76. The method of claim 75, wherein the new control password comprises a plurality of numbers and the step of generating said new control password further comprises the step of increasing each of the individual numbers of said new control password by one.

77. The method of claim 76, wherein said predetermined period of time is one month.

78. The method of claim 76, wherein the step of providing said control panel further comprises the step of creating at least one function associated with at least one of said keys, wherein said function is performed by pressing said key.

79. The method of claim 78, wherein the step of creating at least one function comprises the step of performing said function during said power flow interruption from said power source to said heat generator.

80. The method of claim 79, wherein said at least one function is selected from the group consisting of displaying information on said control panel and displaying a generation date of said new control password.

* * * * *